Figure 9:
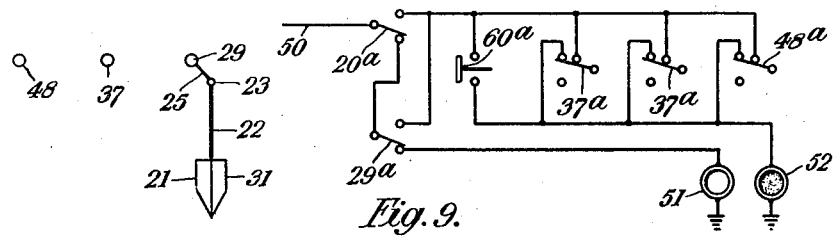
Figure 10:
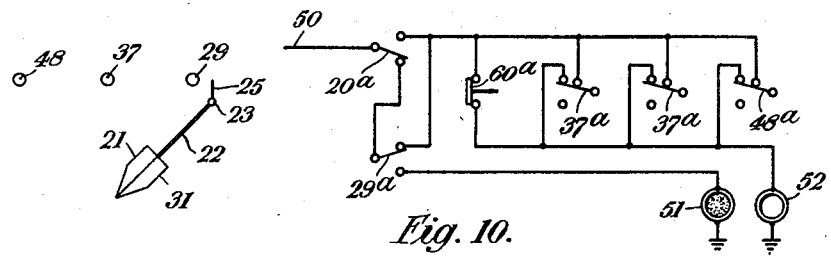
Figure 11:
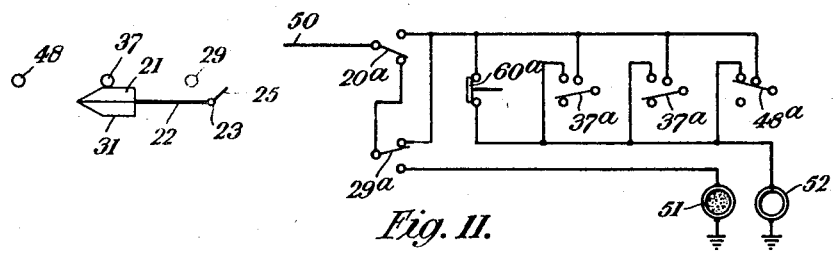

Aug. 7, 1951 E. J. NICHOLL 2,563,263
TWO STAGE RETRACTABLE FLOAT FOR AIRCRAFT
Filed Oct. 23, 1948 8 Sheets-Sheet 1
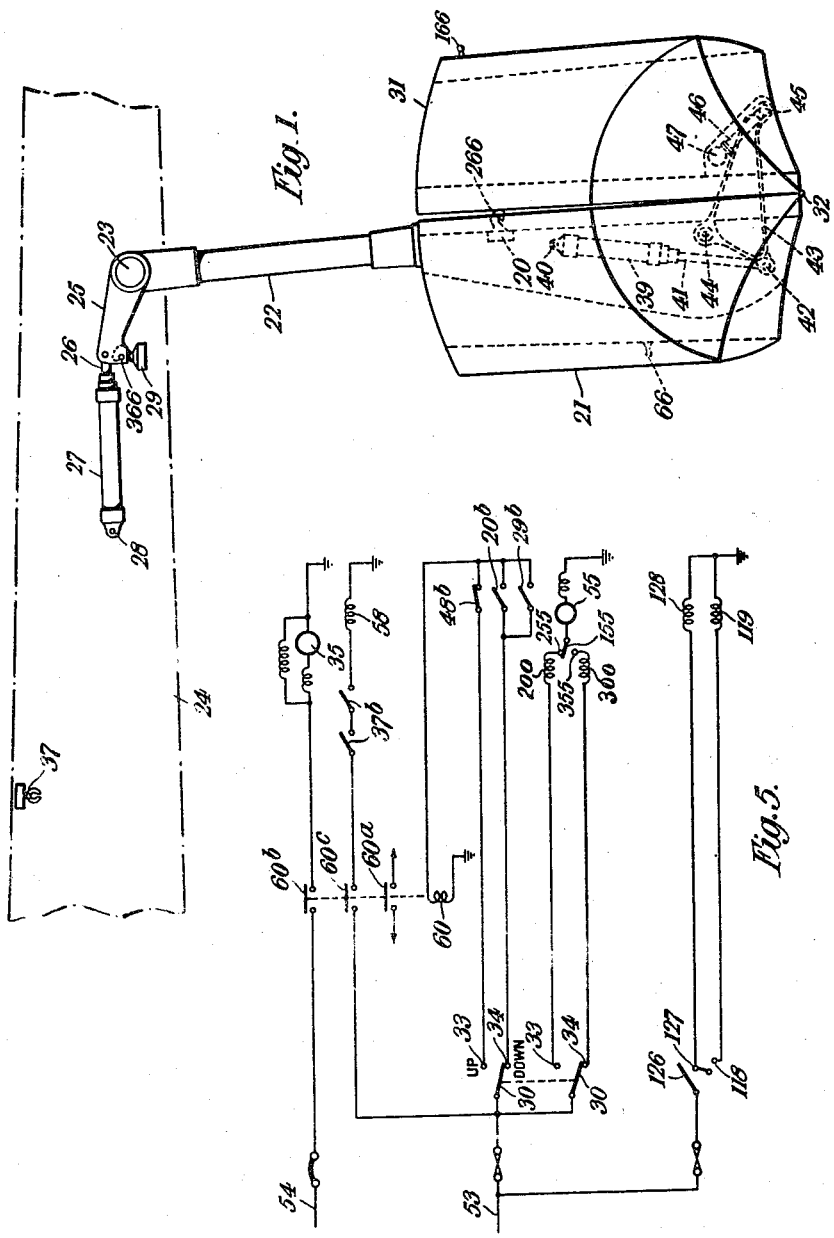
INVENTOR
EDWARD JAMES NICHOLL
BY Moses, Nolte, Crews and Berry
ATTORNEYS Aug. 7, 1951 E. J. NICHOLL 2,563,263
TWO STAGE RETRACTABLE FLOAT FOR AIRCRAFT
Filed Oct. 23, 1948 8 Sheets-Sheet 2
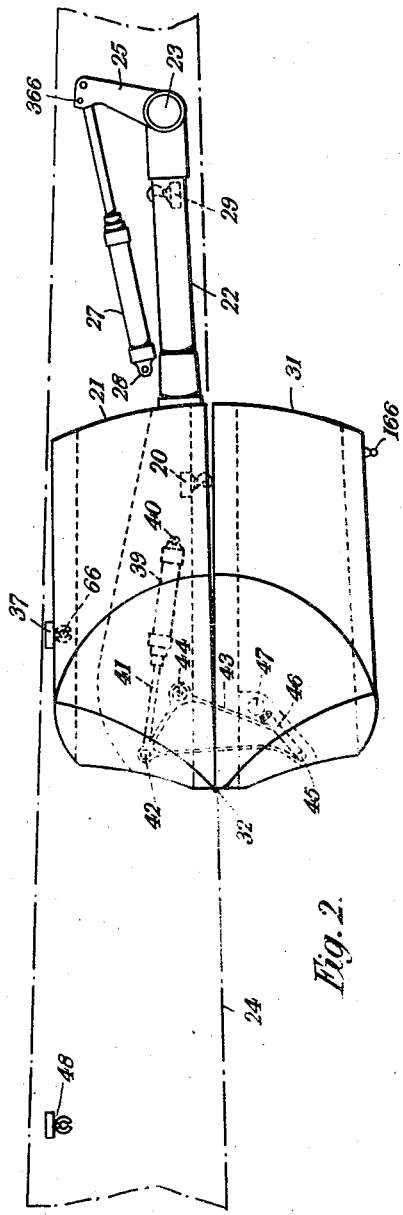
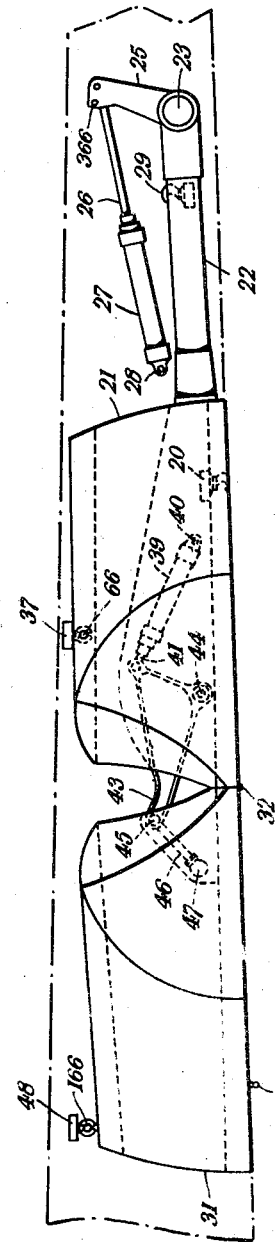

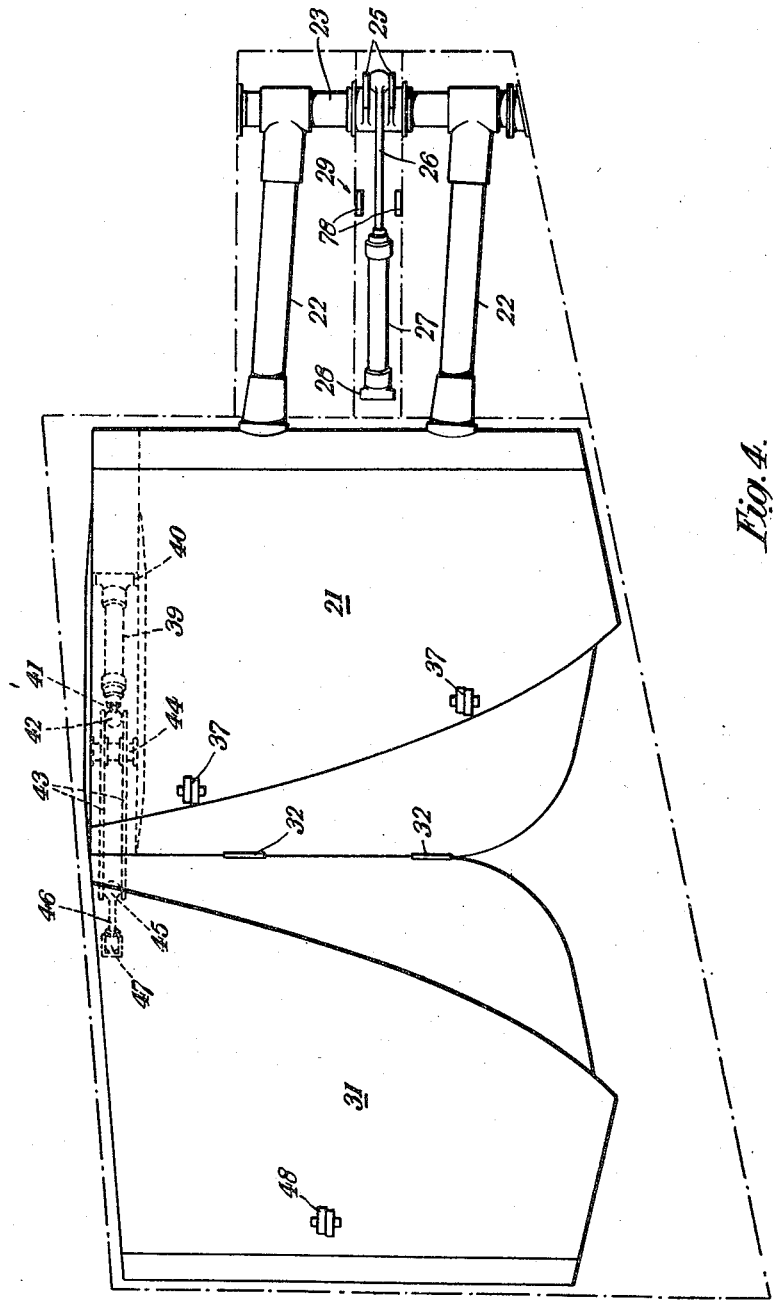

Aug. 7, 1951    E. J. NICHOLL    2,563,263
TWO STAGE RETRACTABLE FLOAT FOR AIRCRAFT
Filed Oct. 23, 1948    8 Sheets-Sheet 4
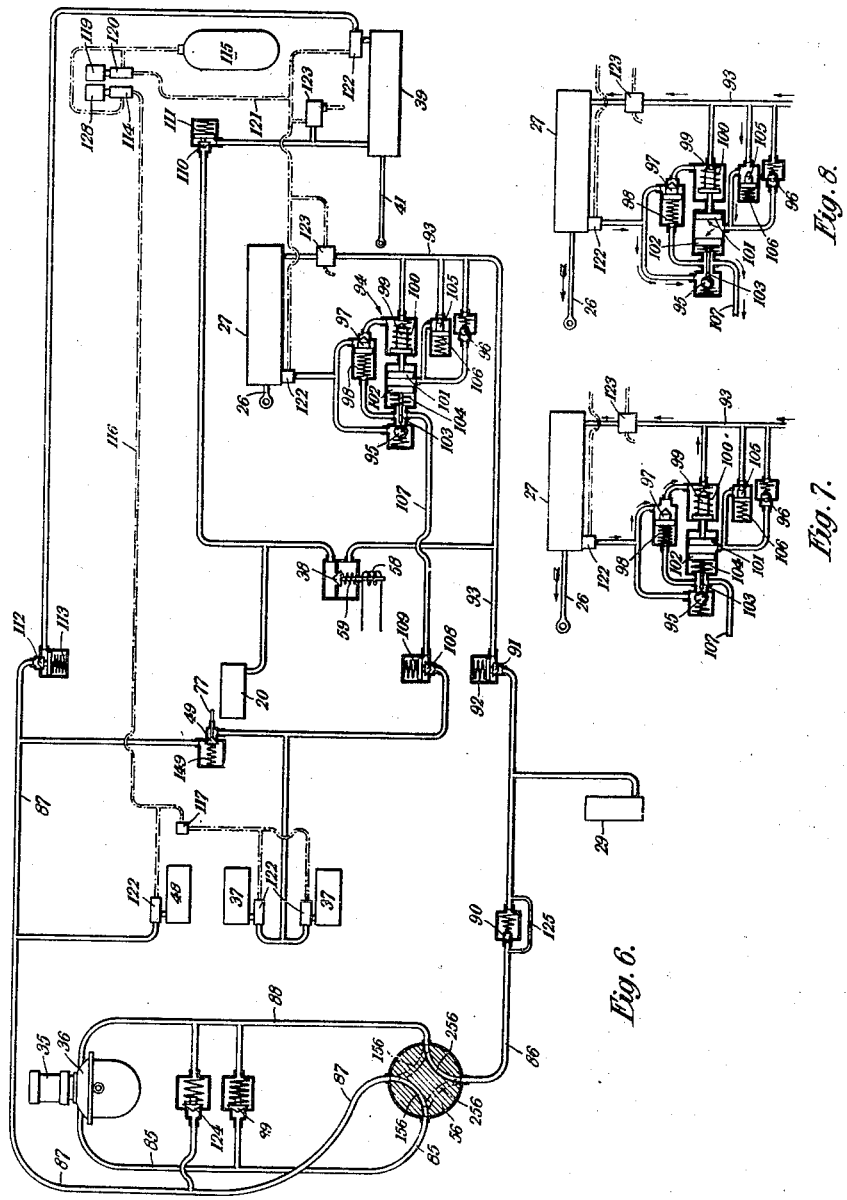
INVENTOR
EDWARD JAMES NICHOLL
By Mason, Nolte, Crews and Berry
ATTORNEYS Aug. 7, 1951   E. J. NICHOLL   2,563,263
TWO STAGE RETRACTABLE FLOAT FOR AIRCRAFT
Filed Oct. 23, 1948   8 Sheets-Sheet 5

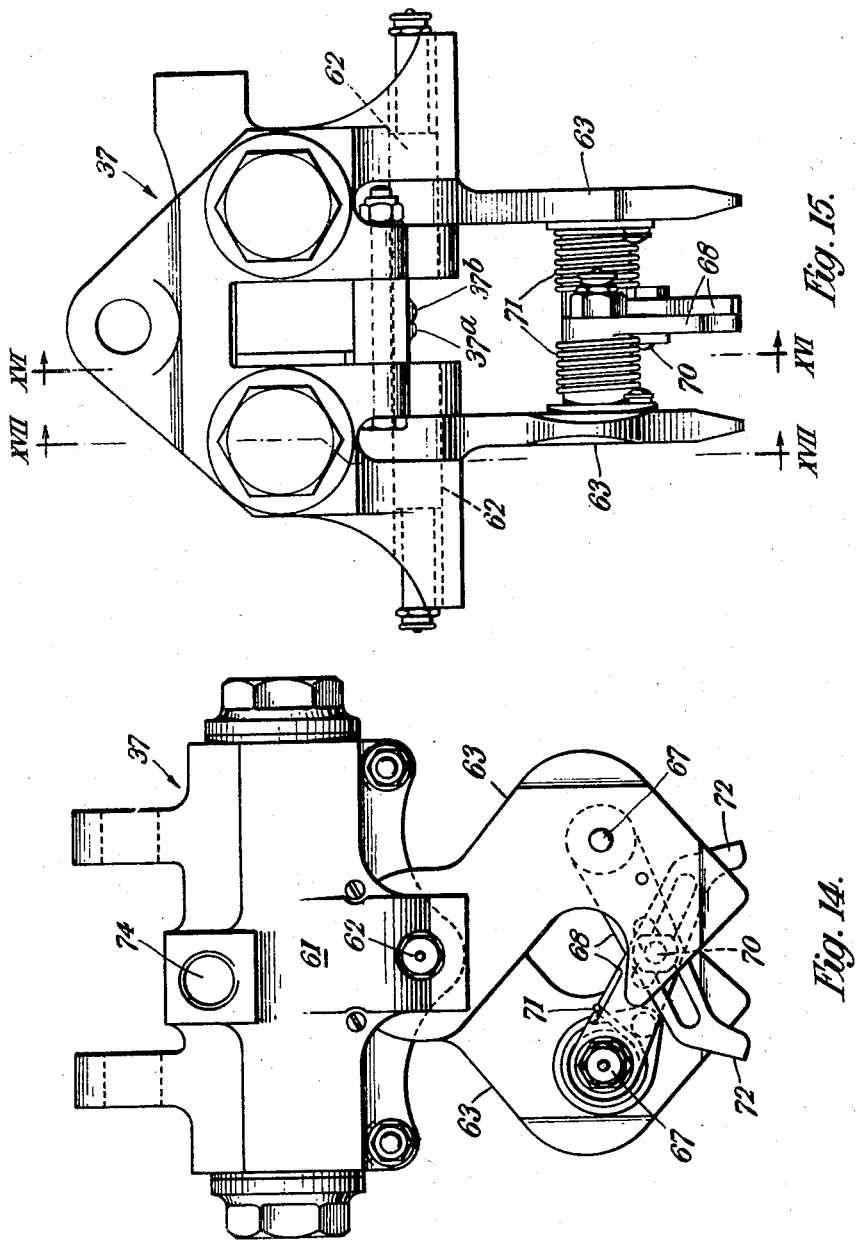

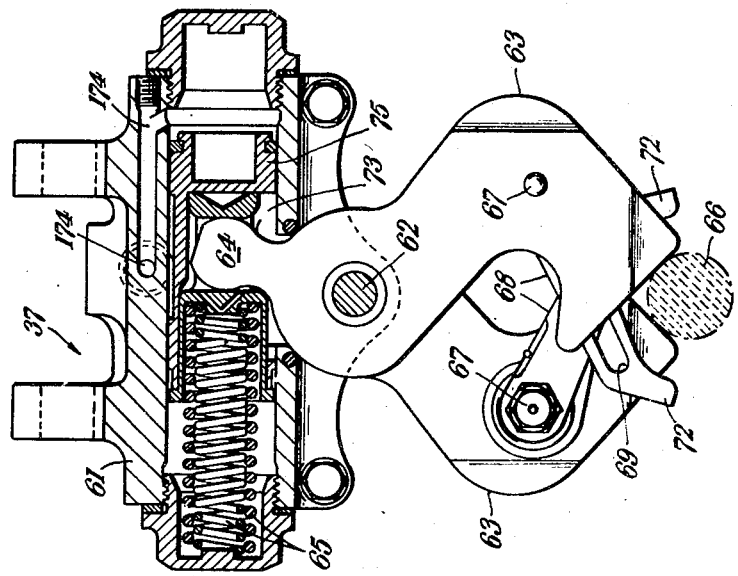
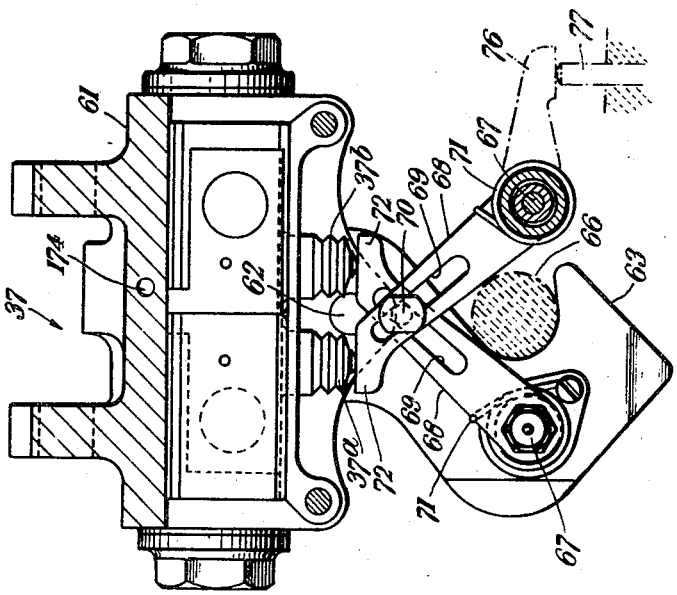

Aug. 7, 1951 E. J. NICHOLL 2,563,263
TWO STAGE RETRACTABLE FLOAT FOR AIRCRAFT
Filed Oct. 23, 1948 8 Sheets-Sheet 8

Patented Aug. 7, 1951

2,563,263

UNITED STATES PATENT OFFICE 2,563,263

TWO STAGE RETRACTABLE FLOAT FOR AIRCRAFT

Edward James Nicholl, Cheltenham, England, assignor to Saunders-Roe Limited, Osborne, East Cowes, Isle-of-Wight, England Application October 23, 1948, Serial No. 56,146
In Great Britain November 6, 1947

12 Claims. (Cl. 244—102)

In United States Patent No. 2,285,330 there is described an aircraft provided with laterally retractable stabilising floats, each formed of separate watertight portions connected by a fore and aft hinged joint which is closed in the down position of the float but is arranged to open, as the float is retracted, to permit of separation of the two portions thereof and their accommodation in separate recesses in the wing.

Splitting the float in this fashion has the advantage that it is possible to employ a float of sufficient depth for it to serve as an effective lateral stabilizer and nevertheless, owing to the fact that the two portions thereof separate during retraction, to retract the float completely into a thin wing.

In the arrangement described and illustrated in United States Patent No. 2,285,330 the retraction of the split float is effected in a single stage, the float being connected to the wing by a system of struts so disposed that the two portions of the float separate during the movement of the float from the down to the retracted position and are completely separated by the time they are moved simultaneously into their wing recesses.

I now find that it is advantageous to conduct the retraction in two stages and to defer separation of the two portions of the float until after that portion of the float which is approaching the wing (i. e. the inboard portion when, as will normally be the case, the float is retracted in an inboard direction) has been retracted into its wing recess, whereafter, as a second stage operation, the other portion of the float is caused to separate from its companion and move into its wing recess.

The advantages of such two-stage retraction are two-fold. Firstly, the aerodynamic loading on the float during its travel from the down to the retracted position is reduced. The aerodynamic hinge movement curve obtained, in the case of two-stage retraction, consists of two peaks, each of which is of half the magnitude of the single peak obtained with the single-stage method. Therefore, although the average power required is the same in both cases, the peak power is halved in the two-stage case. Secondly, it is possible, in the case of two-stage retraction, to eliminate the cut-aways required in the float itself to accommodate the strut which causes the float to split. Separation of the two sections can, in the case of two-stage retraction, be effected, as later explained, by a hydraulic jack fitted to the back of the float.

The present invention accordingly provides in an aircraft, a laterally retractable stabilising float, split fore and aft into two portions, which float is retractable into the wing of the aircraft in two stages, the float moving as a unit during the first stage, without separation of its constituent portions, to bring one of said portions only into a recess in the wing, and the constituent portions of the float separating, during the second stage, to bring the other of said portions into a recess in the wing.

The invention includes, in an aircraft, the combination with a stabilising float divided into two portions hinged together along the keel line, of a lock for holding the two portions together, means for retracting the float laterally, without release of the lock or separation of its two component portions, until one portion thereof has entered a recess provided for its accommodation in the wing, and mechanism operative thereafter first to release the lock and then to swing the other portion of the float about the hinge to retract it into a further recess in the wing.

Normally, the float will be retracted in an inboard direction, so as first of all to bury the inboard portion of the float in its recess in the wing, whereafter release of the lock and separation of the two portions about the hinge are effected to bury the outboard portion of the float in its recess. On lowering the float, the reverse sequence of operations takes place, the outboard portion of the float first swinging about its hinge into mating relationship with the inboard portion, whereafter the lock is engaged and the complete float is lowered.

Preferably both the first and second stages of retraction of the float are effected by means of hydraulic jacks, located respectively in the wing and in the float. Preferably also the lock between the two portions of the float is likewise operated hydraulically.

One particular embodiment of the invention will now be described in detail, by way of example, with reference to the accompanying drawings, in which Fig. 1 is a front elevation showing the float in the down position, Fig. 2 is a similar view showing the position of the float after the first stage of retraction, Fig. 3 is a similar view showing the float after the second stage of retraction, Fig. 4 is a plan view of the float in the fully retracted position, Fig. 5 is a circuit diagram showing the electrical circuits controlling the operations of raising and lowering the float, the stitches being shown in the positions they occupy when the float is down, Fig. 6 is a hydraulic circuit diagram, showing the parts in the position they occupy when the float is down, Figs. 7 and 8 show successive stages in operation of the change over valve shown in Fig. 6 as the float is raised, Figs. 9-13 are circuit diagrams showing indicators and how they are operated at different stages in the retraction of the float.

Figure 18:
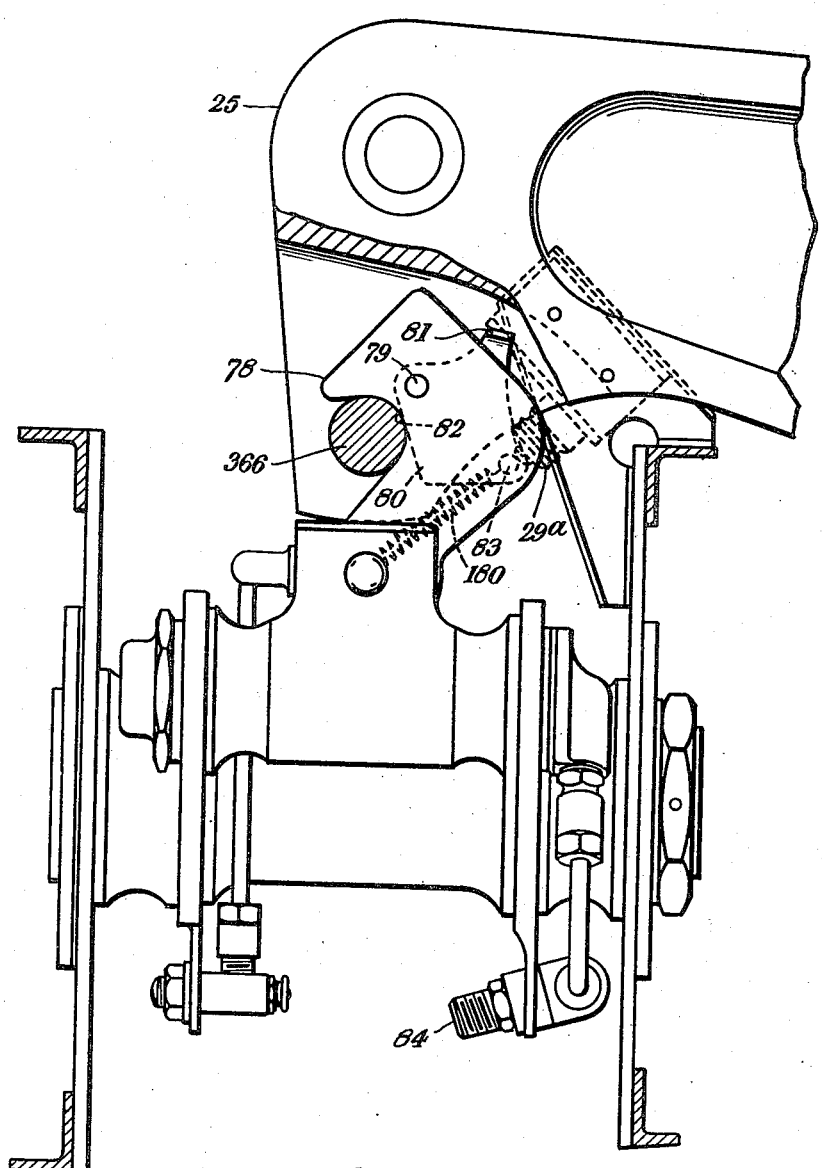

Fig. 14 is a front elevation of one of the outboard up locks, showing the lock in disengaged position, Fig. 15 is a corresponding end elevation, Figs. 16 and 17 are respectively sections taken on the lines XVI—XVI and XVII—XVII in Fig. 15, Fig. 16 showing the lock engaged, and Fig. 18 is a front elevation of the down lock.

Like reference characters designate like parts throughout the figures.

Referring first of all to Figs. 1-4, the float is split vertically along its central longitudinal plane into two separate watertight portions 21, 31 hinged together by a hinge 32 on the keel line and locked together by a float lock 20 near the upper end of the float when the float is down. To the inboard portion 21 of the float are fixed a pair of aligned fore and aft struts 22, fixed at their upper ends to a shaft 23 in the wing 24, which shaft extends chordwise and is mounted for rotation in the wing. The shaft carries a projecting bifurcated arm 25 pivoted to the piston rod 26 of a float raising hydraulic jack 27 mounted in the wing and having its cylinder pivoted to the wing at the end 28 of the cylinder remote from the shaft. A down lock 29 in the wing coacts with the arm 25 to lock the float in the down position, in which the piston rod 26 is retracted into the jack cylinder.

The operation of raising or lowering the floats is initiated by movement of a switch 30 (Fig. 5). When the floats are down, the switch 30 connects a 24-volt supply line 53 to a pair of "down" contacts 34 and to raise the floats the switch is moved to connect line 53 to a pair of "up" contacts 33. To lower the floats again, the switch 30 is moved back to contacts 34. As described later, indicators are provided for showing the pilot the position occupied by the floats and an additional indication is provided for him by the position of the switch 30. Movement of the switch 30 from one pair of contacts 33, 34 to the other, as described in detail later, completes circuits to energise the electric motors of a pair of power packs, one allocated to each float. One only of the power packs, and the hydraulic circuit for operating the associated float is shown in Fig. 6, but it will be understood that a precisely similar power pack, hydraulic circuit, locks, jacks and indicators are associated with the other float, so that a description of the raising and lowering of one of the floats will be sufficient, the other being operated in precisely similar fashion. Each power pack consists of an electric motor 35 (Fig. 6) and a hydraulic pump 36 driven thereby.

When the power pack is set in operation with the float down, hydraulic pressure is first applied, as described in detail later, to the down lock 29, to withdraw it from the arm 25, and then to the jack 27, causing the piston rod 26 to be projected from the jack cylinder and to rotate the shaft 23, clockwise as seen in Fig. 1, to cause inboard retraction of the float through approximately 90°, the two portions 21, 31 of the float remaining locked together during this movement, which brings the float into the position shown in Fig. 2.

When the inboard portion 21 of the float reaches the position shown in Fig. 2, in which it has been fully retracted into an associated recess in the wing, a pair of outboard up locks 37 are automatically operated, by contact of the inboard portion 21 of the float therewith, to lock said inboard portion 21 in the up position. At this stage the outboard portion 31 of the float projects beneath the wing, the plane of division of the two portions being flush with the undersurface of the wing. Operation of the outboard up locks 37 actuates a magnetic sequence valve 38 (Fig. 6) as later described to cause hydraulic pressure to be supplied firstly to release the float lock 20 and permit of separation of the two portions thereof, and secondly to a float splitting jack 39 in the float. It will be noted from Fig. 4 that the jack 39 is fitted to the back of the float. The cylinder of the jack 39 is pivoted at 40 to the inboard portion 21 of the float and its piston rod 41, which is projected from the cylinder in the position shown in Figs. 1 and 2, is pivoted at 42 to a pair of triangular levers 43 which are rotatably mounted at 44 on the inboard portion of the float. The levers 43 are pivoted at 45 to one end of a link 46, the other end 47 of which is pivoted to the outboard portion 31 of the float.

Supply of hydraulic fluid to the float jack 39, after the float lock 20 has been released, causes the piston rod 41 to be retracted, so opening out the outboard portion 31 of the float and rotating it through 180° to the position shown in Fig. 3 to retract it completely into a recess in the wing, in which it is automatically locked by engagement of the outboard portion with an inboard up lock 48 in the recess.

When it is desired to lower the float, the sequence of operations is reversed. First the inboard up lock 48 is released hydraulically and pressure is supplied to the float jack 39 to cause the outboard portion 31 to collapse against the inboard portion 21, the float lock 20 automatically locking the two portions of the float together when contacted by the returning outboard portion. The float has then attained the position of Fig. 2. The float lock 20, when actuated to lock the two portions of the float together, automatically operates a valve 49 (Fig. 6) to cause hydraulic pressure to be supplied firstly to the outboard up locks 37 of the float to release these locks, and secondly to the float raising jack 27, which thereupon returns the float to the lowered position (Fig. 1) in which it is automatically locked by the down lock 29 associated with the arm 25.

Figure 12:
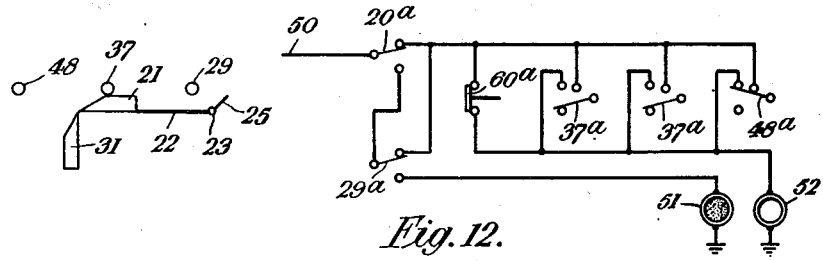
Figure 13:
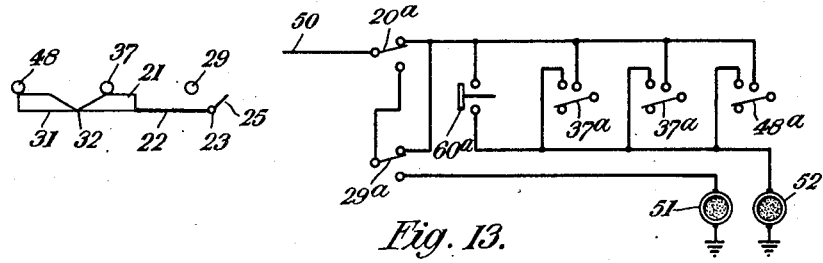

All of the locks, viz. the down lock 29, the float lock 20, the outboard up locks 37 and the inboard up lock 48 are mechanically closed but are opened by hydraulic pressure. Associated with each lock is a pair of micro-switches which are operated, as later described, when the lock is fully closed. One microswitch of each pair controls the indicator circuits shown in Figs. 9-13 and is identified by the numeral of its associated lock and the suffix *a*. In the down position of the float, shown in Fig. 9, a circuit is completed to earth, from a line 50, through the float lock switch 20ª and the down lock switch 29ª to light a green lamp 51. After the down lock 29 has opened, the switch 29ª moves to the position of Fig. 10, and during transit of the float from the position of Fig. 1 to that of Fig. 2 a circuit is completed, through the switches 29a, outboard up-lock switches 37a, inboard up lock switch 48a, and a relay switch 60a (the last four switches in parallel) to light a red lamp 52. Relay switch 60a is closed when a relay 60 (Fig. 5) is energised, as later described, to switch on the power pack motor. When the float has been locked by the outboard up locks in the position shown in Fig. 2, the switches 37a move to the position shown in Fig. 11. A circuit is nevertheless still completed to light the red lamp 52 through the switches 60a and 48a. When the float lock 20 has opened, the switch 20a moves to the position of Fig. 12 and while the float is in transit from the position of Fig. 2 to that of Fig. 3, the red lamp 52 continues to be lighted as shown in Fig. 12. Finally, when the float has been locked in the position of Fig. 3 by closure of the inboard up lock, the relay 60 is de-energised, as later described, to open the switch 60a, switch 48a has also opened, and both lamps 51, 52 are off as shown in Fig. 13.

The other microswitch of each pair controls the circuits shown in Fig. 5. Each such switch is designated by the numeral applied to its associated lock, with the suffix b. When the outboard up locks 37 are unlocked, the circuit through the associated microswitches 37b is broken. When the inboard up lock is unlocked, the circuit through its associated microswitch 48b is made. When the float lock 20 and down lock 29 are unlocked, circuits through their associated microswitches 20b, 29b are made.

Fig. 5 shows the conditions prevailing when the float is down. Movement of the switch 30 from contacts 34 to contacts 33 completes a circuit from line 53 and through limit switch 155 to start a reversible motor 55 having field windings 200, 300. Under these conditions field winding 200 is operative and the motor rotates in the direction to move a rotary control valve 56 clockwise from the position shown in full lines in Fig. 6 to its alternative position, shown in chain-dotted lines, for raising the floats. In the full line position of the valve 56 shown in Fig. 6, its passage 156 connects lines 85, 87 and its passage 256 connects lines 86, 88 and this is the position appropriate for lowering the floats. Clockwise rotation of the valve 56 through 90° will, however, cause the passage 156 to connect lines 87, 88 and the passage 256 to connect lines 85, 86 and this is the position appropriate for raising the floats. When the valve 56 has been rotated clockwise through 90°, the limit switch 155 moves from its contact 255 to its contact 355, thereby stopping the motor 55. Movement of the switch 30 from contacts 34 to contacts 33 also completes a circuit from line 53, through the closed switch 48b and relay 60 to earth, thereby energising the relay and closing switch 60a (see also Figs. 9-13) and switches 60b and 60c. Closure of switch 60b completes a circuit from a 120 volt supply line 54 to start the power pack motor 35.

When the float has reached the position of Fig. 2, and the outboard up locks 37 have closed, a circuit is completed from line 53 through switches 60c and 37b to energise a solenoid 58 for operating the magnetic sequence valve 38 (Fig. 6) previously referred to. This valve is normally held closed by a spring 59, but is opened magnetically, by energisation of the solenoid 58, to supply hydraulic pressure to the float lock 20 and to the float splitting jack 39. When the float has moved to the position of Fig. 3, and the inboard up lock 48 has closed, the switch 48b (Fig. 5) opens to de-energise the relay 60, open contacts 60a-c and stop the power pack motor.

When the switch 30 is thereafter returned to contacts 34, a circuit is completed through field winding 300 and limit switch 155 to start the motor 55 in the reverse direction. This causes counterclockwise rotation of the valve 56 (Fig. 6) through 90°, returning it to its full line position, which is the position suitable for lowering the floats. When the valve 56 has reached this position, the limit switch 155 returns to contact 255 and the motor 55 stops. Return of the switch 30 to contacts 34 also causes the relay 60 to be energised through the switches 20b and 29b which are now closed. Closure of switch 60b starts the power pack motor 35 as before. The float is then lowered, switch 20b being opened when the float lock 20 closes. When switch 29b opens, as the result of closing of the down lock 29, the relay 60 is de-energised and the motor 35 is therefore stopped.

Each of the outboard up locks 37 is of the construction shown in Figs. 14-17. It comprises a casing 61, mounted within the wing structure, to which is pivoted on pins 62 a pair of hooks 63. At its upper end, each hook 63 has a projection 64 (Fig. 17), against which presses a pair of compression springs 65. The springs 65 thus normally hold the hooks 63 in the position shown in Fig. 14. As the inboard section 21 of the float ascends into the recess in the wing, a bar 66 carried by the float moves up into position between the hooks, as shown in Fig. 17. As the bar 66 continues to ascend, it pushes the hooks aside and, when the upward movement of the float is completed, the hooks snap back to lock the bar 66 as shown in Fig. 16. Pivoted at 67 to each hook is a lever 68. The levers 68 have slots 69 into which is fitted a pin 70 coupling the levers together. Torsion springs 71 normally maintain the levers 68 in the down position shown in Fig. 14. As the bar 66 passes into position between the hooks 63, however, it lifts the levers 68 and, when the hooks 63 snap back to lock the bar 66, as shown in Fig. 16, extensions 72 of the levers 68 operate the microswitches 37a, 37b. When the bar 66 is in a position between those shown in Figs. 16 and 17 the hooks 63 are held apart by the bar and the projections 72 can only make contact with the microswitches 37a and 37b when the hooks have snapped back, so that the microswitches are not operated until the bar is securely locked.

The outboard up locks thus close mechanically and by spring action. They are opened hydraulically. Each spring 65 is disposed in a cylinder 73. To open the lock, hydraulic pressure is supplied to a pressure inlet 74, and thence through passages 174 (Fig. 17) to the two cylinders. The pressure so admitted acts on a piston 75 in each cylinder and, by compressing the spring 65, moves the associated hook 63 to open position. Immediately therefore pressure is supplied to the lock the hooks are moved to open position and remain open so long as the pressure is maintained. Immediately the pressure is applied and the hooks move away from the closed position, the projections 72 are moved away from the microswitches.

The inboard up lock 48 is of exactly similar construction, and a bar 166 (Fig. 1) similar to bar 66 is provided on the outboard section 31 of the float for engagement with the hooks of this lock. The float lock 20 is also similar, a bar 266, similar to bar 66, on the outboard section 31 of the float engaging the hooks of the float lock. The float lock, however, has to perform a further function, namely to open a mechanical sequence valve 49 (Fig. 6) when the lock closes. This valve is normally held closed by a spring 149, but when the float lock closes an extension, indicated in chain dotted lines at 76 in Fig. 16, one of the levers 68 coacts with the stem 77 of the valve 49 to open the valve.

The down lock 29 is of somewhat different construction and is shown in Fig. 18. A bar 366 on the arm 25 cooperates with a pair of pivoted hooks 78, only one of which is shown in Fig. 18, the other lying immediately behind it. Both hooks 78 are however seen in Fig. 4. The hooks are urged counterclockwise by springs similar to the springs 65 in Fig. 17. As the bar 366 descends, it pushes the hooks aside and they afterwards snap back to the position shown in Fig. 18 to lock the bar. On each hook 78 is pivoted, at 79, a lever 80. Each lever is associated with one of a pair of microswitches 29a, 29b. Normally each of the levers 80 is held, by a spring 180, with a lug 81 on its upper end resting on the upper edge of the associated hook 78. As the hooks snap back to lock the bar 366, the latter presses against the inner edges 82 of the levers and displaces them into the position shown in Fig. 18, in which pins 83 carried by the levers operate the microswitches. To open the lock, hydraulic pressure is applied to an inlet 84 and this pressure, acting on a pair of pistons similar to the pistons 75 in Fig. 17, compresses the springs and moves the hooks 78 to the open position, the levers 80 then being freed and being returned by their springs 180 to a position in which their pins 83 are clear of the microswitches 29a, 29b.

The complete sequence of operation on raising and lowering the floats, will now be explained with reference to Figs. 6-8.

*Raising the floats*

It has already been explained how movement of the switch 30 (Fig. 5) from the "down" contacts 34 to the "up" contacts 33 starts the motor 35 of the power pack and also the motor 55 of the control valve 56, which is thereupon moved into the position shown in chain dotted lines in Fig. 6. The pump 36 then supplies oil under pressure from pressure line 85, via passage 256 in the valve, to line 86 and oil is returned, through the valve 56, from line 87 and passage 156 in the valve to the return line 88 of the pump. A relief valve 89 limits the oil pressure to 3000 lbs./sq. in. Oil flows from line 86 through a variable flow valve, constituted by a non-return valve 90 in parallel with a restricted passage 125, to the down lock 29 and opens that lock. As soon as the lock 29 has opened, the oil pressure overcomes the pressure of a spring 92 of a pressure sequence valve 91, and passes into line 93 and thence to a change over valve 94 controlling operation of the float raising jack 27.

The retraction operation is carried out in two stages, in order to economise in power. Initially, hydraulic pressure is supplied to both ends of the cylinder of jack 27. During this initial stage in the retraction of the float the load imposed on the jack, by the weight of the float and the aerodynamic loading thereon, is small and the jack operates, despite the application of pressure to both ends of the cylinder, at high speed and low torque. As the float rises, the load imposed on the jack as the result of the moment about the axis of the shaft of the weight of the float and the aerodynamic loading on the float, rises. Therefore the torque and the delivery pressure of the pump rise, and when the delivery pressure reaches a predetermined value the change-over valve 94 operates automatically to connect the end of the jack cylinder from which the piston rod 26 projects to exhaust instead of to pressure. Thereafter the jack operates slowly and at high torque.

The change over valve operates as follows: When pressure is admitted to line 93, it at once operates directly on the right hand side of the jack piston. The change over valve comprises a pair of non-return valves 95, 96, a valve 97 loaded by a spring 98, a valve 99 normally held open by a spring 100 and carrying a piston 101 a second piston 102 carrying a tappet 103 and normally held in the position shown in Fig. 6 by a spring 104, and a valve 105 normally held closed by a spring 106. When pressure is supplied to line 93, the valve 97 opens, as shown in Fig. 7, with the result that pressure is supplied also to the left hand side of the jack piston as the area exposed to pressure of the left hand face of the jack piston is, due to the jack piston rod 26, less than that of the right hand face, the jack piston will move to the left and during the initial stage of the retraction movement, therefore, liquid circulates as shown by the arrows in Fig. 7, and the float is retracted at high speed and low torque. The pressure in the line 93 increases as the load on the jack increases, until the maximum jack pressure is reached. This occurs when the float has travelled through about 60° and the valve 105 then opens, as shown in Fig. 8, admitting pressure to the space between the pistons 101, 102. These move apart, closing the valve 99 and causing the tappet 103 to open the non-return valve 95. Pressure is thus disconnected from the left hand end of the jack cylinder and liquid can flow from that end of the cylinder to line 107, and thence to the return line 87 through a pressure sequence valve 108 and the mechanical sequence valve 49, these valves being lifted against their respective springs 109, 149.

The float continues to move up at a slower speed and, when the outboard up locks 37 have closed, the resultant closure of switches 37b (Fig. 5) energises the solenoid 58 as already described and thereby opens the magnetic sequence valve 38. Pressure is then fed to the float lock 20, opening that lock. A pressure sequence valve 110 then opens against its spring 111, and admits pressure to the left hand end of the cylinder of the float splitting jack 39. Fluid is expelled from the right hand end of this cylinder to the return line 87 through a pressure sequence valve 112 which opens against its spring 113.

The two sections of the float then separate and, when the inboard up lock 48 has closed, the motor 35 of the power jack is stopped, as already described, by the opening of switch 48b (Fig. 5). When the motor 35 is switched off, the non-return valve 95 of the change over valve closes and the pistons 101, 102 return to the position of Fig. 6 expelling liquid through the non-return valve 96, and valve 105 closes.

*Lowering the floats*

It has already been explained that, on movement of the lever 30 (Fig. 5) from the "up" contacts 33 to the "down" contacts 34, the power pack motor 35 is started and that the motor 55 is also started to move the valve into float-lowering position. Line 87 is then connected to the pressure line 85 and line 86 to the exhaust line 88. Pressure is thus first applied to the inboard up lock 48 to open that lock. The pressure sequence valve 112 then opens applying pressure to the right hand end of the cylinder of the float splitting jack 39, liquid being expelled from the left hand end of that cylinder, through the valves 110, 38 and 91, to the return line, and the jack operating to collapse the outboard section of the float against the inboard section. When the float lock 20 closes, as the result of the two sections of the float coming together, it opens the mechanical sequence valve 49 as already described. Pressure is then applied to the outboard up locks 37, opening them. After the locks have opened, the pressure sequence valve 108 opens, supplying pressure to the change over valve 94. The non-return valve 95 opens, supplying pressure to the left hand end of the cylinder of the float raising jack, causing the same to lower the float. Liquid flows to the return line from the right hand end of this cylinder through the valve 91. During lowering of the float the jack 27 operates in a single stage only. When the float has been lowered, the down lock 29 closes and stops the motor 35, as already described, by opening the switch 20$^b$ (Fig. 5). A relief valve 124, opening at 1000 lbs./sq. in., is interposed between the lines 87, 88 so as to keep the load down during lowering of the floats, as only comparatively small power is needed for lowering. The non-return valve 90 closes so that the restricted passage 125 affords the sole passage through which liquid may flow to return during the lowering operation. This retards movement of the float to the down position.

*Emergency operation*

An emergency air system, shown in chain dotted lines in Fig. 6, is provided for lowering the floats in case of failure of the hydraulic pressure. Movement of an emergency switch 126 (Fig. 5) to a contact 127 connects a solenoid 128 in circuit to the supply line 53, thereby energizing the solenoid and causing it to open a valve 114 (Fig. 6), thereby admitting compressed air from a bottle 115 to a line 116 leading to the inboard up lock 48. After the lock 48 has opened, a pressure sequence valve 117 opens, and compressed air is fed to the outboard up locks 37 to open them. The switch 126 is then moved to contact 118, energizing a solenoid 119 to open a valve 120. Compressed air is then supplied, via a line 121, to the two jacks 27, 39 simultaneously, thereby causing the float to move to the down position, in which it will be locked by the float lock 20 and down lock 29.

Shuttle valves 122 are fitted to the up locks 37, 48 and to the jacks 27, 39. When air is admitted to the line 116, the shuttle valves 122 associated with the locks open to supply air to the locks to move their hooks to open position against the action of their springs. When the shuttle valves 122 open, they disconnect the locks from the lines which normally feed oil to them, so that the air pressure cannot escape through a fractured oil pipe. The shuttle valves 122 associated with the jacks 27 and 39 similarly open, when air pressure is supplied to the line 121, to admit air to the left hand end of the cylinder of the jack 27 and to the right hand end of the cylinder of the jack 39 and to cut off those ends of the cylinder from the associated oil pipes.

Each jack is fitted with an emergency air release valve 123, which is opened by the air pressure when the valve 120 opens, to afford an outlet to atmosphere for oil expelled from the jack cylinders as the jacks are operated by the air pressure to close up and lower the float.

What I claim as my invention and desire to secure by Letters Patent is:

1. In an aircraft, comprising a wing and a stabilising float divided into two portions hinged together along the keel line of the float, the combination with said float of a float lock for locking the two portions of the float together, a first power operated retractor for retracting the float laterally, and with the two portions thereof locked together, to introduce one portion of the float into a recess in the wing, means responsive to the entry of said portion into said recess for automatically releasing the float lock, and a second power operated retractor, rendered operative by release of said float lock, for separating the two portions of the float.

2. In an aircraft, comprising a wing and a stabilising float divided into two portions hinged together along the keel line of the float, the combination with said float of a float lock for locking the two portions of the float together, a first power operated retractor for retracting the float laterally in an inboard direction, and with the two portions thereof locked together, to introduce one portion of the float into a recess in the wing, an up lock for locking said portion to the wing, means responsive to operation of said up lock for automatically releasing the float lock, and a second power operated retractor, rendered operative by release of said float lock, for separating the two portions of the float.

3. In an aircraft, comprising a wing and a stabilising float divided into two portions hinged together along the keel line of the float, the combination with said float of a float lock for locking the two portions of the float together, a first hydraulic jack for retracting the float laterally, and with the two portions thereof locked together, to introduce one portion of the float into a recess in the wing, means responsive to the entry of said portion into said recess for automatically releasing the float lock, and a second hydraulic jack, rendered operative by release of said float lock, for separating the two portions of the float.

4. In an aircraft comprising a wing and a stabilising float, the combination of a hydraulic jack in the wing for retracting the float laterally into the wing, said jack comprising a relatively movable cylinder and piston and said piston having a piston rod projecting from one end of the cylinder, a pump for supplying motive fluid to the jack cylinder, and a two-stage change-over valve responsive to the hydraulic pressure delivered by said pump to said cylinder, said change-over valve initially supplying pressure fluid to both ends of said cylinder but operating automatically, at a predetermined hydraulic pressure, to connect to exhaust the end of the cylinder from which said piston rod projects.

5. In an aircraft, comprising a wing and a stabilising float divided into two portions hinged together along the keel line of the float, the combination with said float of a float lock for locking the two portions of the float together, a structure supporting the float and hinged to the wing, a down lock for locking said structure in position to support the float in the down position, a first power operated retractor, a second power operated retractor, control devices for respectively releasing the down lock, operating the first retractor to retract the float laterally into the wing, releasing the float lock and operating the second retractor to separate the two portions of the float, and means operable by the pilot for rendering said control devices successively effective to retract said float into said wing.

6. In an aircraft, having a wing and a stabilising float divided into two portions hinged together along the keel line, the combination with said float of a lock for holding the two portions together, a hydraulic jack in the wing for retracting the float laterally and in an inboard direction, without release of the lock or separation of its two component portions, until the inboard portion thereof has entered a recess in the wing, an outboard up lock in the wing for locking the inboard portion of the float in its recess, a jack in the float for effecting relative movement of the two portions of the float, an inboard up lock in the wing for locking the outboard portion of the float in a recess in the wing, a down lock for locking the float in the down position, all of said locks being arranged to close mechanically on contact of the part to be locked with the lock and to release hydraulically, a hydraulic pump, means controlled by the pilot for starting the pump, a hydraulic circuit for the fluid delivered by the pump, valves in said circuit, and means for operating said valves automatically and in sequence to direct said fluid first to the down lock to release it, then to the jack in the wing to raise the float, then to the float lock to release it and finally to the jack in the float to separate the portions of the float.

7. In a hydraulic retracting gear for an aircraft float split into two relatively movable sections, the combination of a hydraulic pump, a hydraulically releasable down lock for locking the float in the down position, a hydraulically releasable float lock for holding the two sections of the float together, a first hydraulic jack for raising and lowering the float, a second hydraulic jack for separating and returning the two sections of the float, a hydraulic circuit for supplying fluid from said pump to said locks and jacks, a control valve operable by the pilot to supply fluid from said pump to said circuit to open said down lock, a pressure sequence valve in said circuit arranged to open, in response to opening of said down lock to supply fluid to said first jack to raise the float, an up lock arranged to be closed by the float to lock the float in the raised position, and a valve in said circuit operable by closure of said up lock to supply fluid to said float lock to open said float lock, and a pressure sequence valve in said circuit arranged to open, in response to opening of said float lock, to supply fluid to said second jack to effect separation of the two sections of said float.

8. Apparatus as claimed in claim 3, including an emergency pneumatic float lowering gear comprising a reservoir of compressed gas, and a valve operable by the pilot to supply compressed gas from said reservoir to said jacks, said compressed gas being effective to operate said jacks to lower the float and to approach its two portions together.

9. In an aircraft, having a wing and a stabilising float divided into two portions hinged together along the keel line, the combination with said float of a lock for holding the two portions together, a hydraulic jack in the wing for retracting the float laterally and in an inboard direction, without release of the lock or separation of its two component portions, until the inboard portion thereof has entered a recess in the wing, an outboard up lock in the wing for locking the inboard portion of the float in its recess, a jack in the float for effecting relative movement of the two portions of the float, an inboard up lock in the wing for locking the outboard portion of the float in a recess in the wing, a down lock for locking the float in the down position, all of said locks being arranged to close mechanically on contact of the part to be locked with the lock and to release hydraulically, a hydraulic pump, means controlled by the pilot for starting the pump, a hydraulic circuit for the fluid delivered by the pump, fluid directing valves in said circuit, a reversing valve for reversing the direction of circulation of fluid by said pump and means for effecting alternative control over said fluid directing valves, according to the position of said reversing valve, to actuate said locks and jacks to raise and lower said float.

10. Apparatus as claimed in claim 9, a switch movable by the pilot to alternative positions to select raising and lowering movement of the float, and electromagnetic means energised by movement of said switch to start said motor and to actuate the reversing valve to select the appropriate direction for circulation of fluid in said circuit.

11. Apparatus as claimed in claim 10, comprising a pair of switches for switching off said motor, one of said switches being linked to the inboard up lock and operable by closure thereof at the conclusion of the float retracting operation and the other of said switches being linked to the down lock and operable by closure thereof at the conclusion of the float lowering operation.

12. Apparatus as claimed in claim 11, comprising further switches associated with the inboard up lock and the down lock and arranged to occupy alternative positions according as whether the associated locks are released or closed, warning lamps, and circuits controlled by said further switches to energise said warning lamps to show to the pilot the position of the float.

EDWARD JAMES NICHOLL.

REFERENCES CITED

The following references are of record in the file of this patent:

UNITED STATES PATENTS

| Number | Name | Date |
| --- | --- | --- |
| 2,204,457 | Vogt | June 11, 1940 |
| 2,285,330 | Dowden | June 2, 1942 |